(12) United States Patent
Ihara et al.

(10) Patent No.: US 7,703,710 B2
(45) Date of Patent: Apr. 27, 2010

(54) CUBIC BORON NITRIDE, METHOD FOR PRODUCING CUBIC BORON NITRIDE, GRINDING WHEEL WITH CUBIC BORON NITRIDE, AND SINTERED CUBIC BORON NITRIDE COMPACT

(75) Inventors: Eiji Ihara, Shiojiri (JP); Taishu Yanagisawa, Shiojiri (JP)

(73) Assignee: Showa Denko K.K., Tokyo (JP)

( * ) Notice: Subject to any disclaimer, the term of this patent is extended or adjusted under 35 U.S.C. 154(b) by 1106 days.

(21) Appl. No.: 10/568,438

(22) PCT Filed: Aug. 19, 2004

(86) PCT No.: PCT/JP2004/012222

§ 371 (c)(1),
(2), (4) Date: Feb. 14, 2006

(87) PCT Pub. No.: WO2005/019371

PCT Pub. Date: Mar. 3, 2005

(65) Prior Publication Data
US 2006/0204421 A1    Sep. 14, 2006

Related U.S. Application Data

(60) Provisional application No. 60/498,285, filed on Aug. 28, 2003.

(30) Foreign Application Priority Data
Aug. 20, 2003    (JP)    ............................... 2003-296488

(51) Int. Cl.
*C01B 21/064* (2006.01)
*C04B 35/5831* (2006.01)

(52) U.S. Cl. .......................... 241/24.1; 51/307; 241/30; 423/290; 501/96.4

(58) Field of Classification Search ................. 423/290; 51/307; 501/96.4; 241/24.1, 30
See application file for complete search history.

(56) References Cited

U.S. PATENT DOCUMENTS

| | | | |
|---|---|---|---|
| 3,772,428 A | | 11/1973 | De Vries et al. |
| 4,349,517 A | * | 9/1982 | Lysanov et al. ............. 423/290 |
| 4,551,316 A | * | 11/1985 | Iizuka ........................ 423/290 |
| 4,772,575 A | | 9/1988 | Ota et al. |
| 5,000,760 A | | 3/1991 | Ohtsubo et al. |
| 5,130,549 A | * | 7/1992 | Davies et al. ............. 250/484.3 |
| 5,147,623 A | * | 9/1992 | Eun et al. .................... 423/290 |
| 5,332,629 A | | 7/1994 | Sumiya et al. |
| 5,618,509 A | * | 4/1997 | Shioi et al. ................... 423/290 |

(Continued)

FOREIGN PATENT DOCUMENTS

EP    0 407 946 A1    1/1996

(Continued)

*Primary Examiner*—Wayne Langel
(74) *Attorney, Agent, or Firm*—Sughrue Mion, PLLC (57) ABSTRACT

A method for producing cubic boron nitride in which hBN is held in the presence of a catalyst substance under conditions in which cBN remains thermodynamically stable, to thereby cause hBN to undergo a phase transition to form cBN, wherein the catalyst substance contains a lithium source, a magnesium source, and a carbon source. The performance of cBN is improved even though phase transition ratio from hBN to cBN is increased.

16 Claims, 1 Drawing Sheet

U.S. PATENT DOCUMENTS

| | | | |
|---|---|---|---|
| 5,837,214 A | 11/1998 | Shioi et al. | |
| 6,248,303 B1 * | 6/2001 | Shioi et al. | 423/290 |
| 6,461,990 B1 | 10/2002 | Masuda et al. | |
| 2001/0018036 A1 * | 8/2001 | Shioi et al. | 423/290 |
| 2003/0170161 A1 * | 9/2003 | Iizuka | 423/290 |
| 2004/0265203 A1 | 12/2004 | Ohtsubo et al. | |
| 2005/0220690 A1 * | 10/2005 | Ohtsubo | 423/290 |

FOREIGN PATENT DOCUMENTS

| | | |
|---|---|---|
| JP | 53-47239 | 12/1978 |
| JP | 59-057905 A | 4/1984 |
| JP | 59-073411 A | 4/1984 |
| JP | 59-121167 A | 7/1984 |
| JP | 61-283 B2 | 1/1986 |
| JP | 62-108772 A | 5/1987 |
| JP | 4-2296 B2 | 1/1992 |
| JP | 5-94 B2 | 1/1993 |
| JP | 5-95 B2 | 1/1993 |
| JP | 2000-328170 A | 11/2000 |
| JP | 2001-019411 A | 1/2001 |
| WO | WO 02/076906 A2 | 10/2002 |
| WO | WO 2004/069399 A1 | 8/2004 |

* cited by examiner

CUBIC BORON NITRIDE, METHOD FOR PRODUCING CUBIC BORON NITRIDE, GRINDING WHEEL WITH CUBIC BORON NITRIDE, AND SINTERED CUBIC BORON NITRIDE COMPACT

TECHNICAL FIELD

Priority is claimed on Japanese Patent Application No. 2003-296488, filed Aug. 20, 2003, and U.S. Patent Provisional Application No. 60/498,285, filed Aug. 28, 2003, the contents of which are incorporated herein by reference.

The present invention relates to cubic boron nitride, to a method for producing cubic boron nitride, to a grinding wheel with cubic boron nitride, and to sintered cubic boron nitride compact.

BACKGROUND ART

Cubic boron nitride (which hereinafter may be abbreviated as cBN) is second to diamond in hardness and has chemical stability higher than that of diamond. Thus, cubic boron nitride is increasingly employed as a grinding material, polishing material, or cutting material. A variety of methods for producing cBN have been proposed. Among them, the best known and the most widely employed in industry is a method in which hexagonal boron nitride (which hereinafter may be abbreviated as hBN) is held in the presence of a catalyst substance (which may be referred to as a solvent) under conditions in which cBN remains thermodynamically stable (approximately 4.0 to 6.0 GPa, approximately 1,400 to 1,600° C.), to thereby cause hBN to undergo a phase transition to form cBN.

There have been already proposed catalyst substances composed of an alkali metal, an alkaline earth metal, an alkali metal nitride, an alkali metal boronitride, an alkaline earth metal nitride, an alkaline earth metal boronitride, or the like.

For example, lithium nitride ($Li_3N$) and lithium boronitride ($Li_3BN_2$) have been proposed as the catalyst substance (see Patent Document 1). However, cubic boron nitride produced in the presence of lithium nitride or lithium boronitride is generally in the form of finely divided particles having a particle size of 50 μm or less and insufficiently developed crystal planes. Thus, such cubic boron nitride exhibits poor performance as abrasive grains.

Lithium calcium boronitride ($LiCaBN_2$) has also been proposed as a catalyst substance (see Patent Document 2). The cBN produced in the presence of the catalyst substance assumes a generally spherical form and has excellent mechanical strength.

A mixture of $LiMBN_2$ (M represents an alkaline earth metal) and $Li_8SiN_4$ and a mixture of $LiMBN_2$ and $Ca_5Si_2N_6$ have also been proposed as a catalyst substance (see Patent Documents 3 and 4). The cBN produced in the presence of any of these catalyst substances has a developed (111) crystal plane and excellent mechanical strength.

There has been proposed a method for producing cubic boron nitride employing a carbon source, an Si source, an alkali metal hydride, an alkaline earth metal hydride, or another catalyst substance (see Patent Document 5). The cBN produced in the presence of any of these catalyst substances assumes the form of dense, transparent crystalline particles having a sharp edge.

There has also been proposed, as a catalyst for synthesizing cubic boron nitride, a mixture of at least one of lithium nitride and lithium boronitride with at least one of metallic magnesium and magnesium boride, wherein magnesium atoms are contained in an amount of 4 to 85 parts by mole and lithium atoms are contained in an amount of 100 parts by mole (see Patent Document 6). When cBN is synthesized in the presence of the catalyst, the proportion of the crystal grains having a grain size larger than 100 μm increases, crystal planes are more developed, and phase transition ratio from hBN to cBN increases, as compared with the case in which lithium nitride or lithium boronitride is used singly.

(Patent Document 1)
Specification of U.S. Pat. No. 3,772,428

(Patent Document 2)
Japanese Examined Patent Application, Second Publication No. S61-283

(Patent Document 3)
Japanese Examined Patent Application, Second Publication No. H05-94

(Patent Document 4)
Japanese Examined Patent Application, Second Publication No. H05-95

(Patent Document 5)
Japanese Examined Patent Application, Second Publication No. H04-2296, and Specification of U.S. Pat. No. 5,000,760

(Patent Document 6)
Japanese Examined Patent Application, Second Publication No. S53-047239

When the atomic ratio of magnesium with respect to lithium is increased, phase transition ratio into cBN increases; however, when more than 85 parts magnesium atoms by mole are mixed with 100 parts of lithium atoms by mole in the synthesizing catalyst, the number of defects such as holes or the like in the crystal planes of the cBN grains increases; therefore, the atomic ratio of magnesium cannot be increased to more than 85 parts although improvement in phase transition ratio is expected.

An object of the present invention is to solve the aforementioned problems, i.e., the problems in that the number of defects such as holes or the like in the crystal planes of the produced cBN grains increases when the atomic ratio of magnesium with respect to lithium is increased, and thereby to enable use of more than 85 parts magnesium atoms by mole with respect to 100 parts of lithium atoms by mole in the synthesizing catalyst so as to provide a method by which the phase transition ratio into cBN increases, the number of defects such as holes or the like in the crystal planes of the produced cBN grains is decreased, and performance of abrasive grains is improved. Further objects of the present invention are to provide cBN produced through the above method, to provide a grinding wheel of such cBN, and to provide a sintered cBN compact.

DISCLOSURE OF THE INVENTION

The present inventors have carried out extensive research in order to solve the aforementioned problems, and as a result has completed the present invention.

More specifically, when cBN is produced using a method of the present invention, the cBN has fewer defects such as holes or the like in the crystal planes when compared with cBN produced using a conventional method, and performance of abrasive grains is improved, although the phase transition ratio from hBN to cBN is increased. As a result, cBN having performance of abrasive grains which is more superior than that of cBN produced using a conventional method can be produced at a high yield rate. In addition, when cBN is produced under the conditions in which magnesium is contained in an amount of 85 parts by mole or less, and more preferably, 5 to 85 parts by mole, based on 100 parts by mole of lithium atoms, the ratio is substantially the same as that in a conventional method, performance of abrasive grains is significantly improved.

Moreover, when a grinding wheel is fabricated using the cBN of the present invention, it is revealed that grinding performance is improved when compared with a grinding wheel employing cBN produced using a conventional method.

Furthermore, when a sintered compact is fabricated using the cBN of the present invention, unexpected effects are obtained in that cutting performance is improved, and in particular, chipping resistance is improved when compared with a sintered compact employing cBN produced using a conventional method.

Accordingly, the present invention relates to the following.

(1) Cubic boron nitride containing magnesium in an amount from $2 \times 10^{-4}$ mol to $2 \times 10^{-2}$ mol per 1 mol of cubic boron nitride.

(2) Cubic boron nitride as described in (1), wherein the cubic boron nitride contains magnesium in an amount from $2 \times 10^{-3}$ mol to $2 \times 10^{-2}$ mol per 1 mol of cubic boron nitride.

(3) Cubic boron nitride as described in (1) or (2), wherein the cubic boron nitride contains magnesium in an amount from $2 \times 10^{-3}$ mol to $5 \times 10^{-3}$ mol per 1 mol of cubic boron nitride.

(4) Cubic boron nitride as described in any one of (1) to (3), wherein a mean particle size of the cubic boron nitride is 10 µm or less.

(5) A method for producing cubic boron nitride in which hexagonal boron nitride is held in the presence of a catalyst substance under conditions in which cubic boron nitride remains thermodynamically stable, to thereby cause hexagonal boron nitride to undergo a phase transition to form cubic boron nitride, wherein the catalyst substance contains a lithium source, a magnesium source, and a carbon source, and the catalyst substance contains magnesium atoms in an amount of 5 to 300 parts by mole, and carbon atoms in an amount of 0.5 to 30 parts by mole, based on 100 parts by mole of lithium atoms.

(6) A method for producing cubic boron nitride as described in (5), wherein the catalyst substance contains magnesium atoms in an amount of 100 to 300 parts by mole based on 100 parts by mole of lithium atoms.

(7) A method for producing cubic boron nitride as described in (5), wherein the catalyst substance contains magnesium atoms in an amount of 5 to 85 parts by mole based on 100 parts by mole of lithium atoms.

(8) A method for producing cubic boron nitride as described in any one of (5) to (7), wherein the lithium source is at least one selected from the group consisting of metallic lithium, lithium nitride, and lithium boronitride.

(9) A method for producing cubic boron nitride as described in any one of (5) to (8), wherein the magnesium source is at least one selected from the group consisting of metallic magnesium, magnesium nitride, and magnesium boronitride.

(10) A method for producing cubic boron nitride as described in any one of (5) to (9), wherein the hexagonal boron nitride has an oxygen content of 1 mass % or less.

(11) A method for producing cubic boron nitride as described in any one of (5) to (10), wherein the carbon source is at least one selected from the group consisting of graphite, carbon black, amorphous carbon, and a hydrocarbon organic compound.

(12) A method for producing cubic boron nitride as described in any one of (5) to (11), wherein the carbon source is in the form of powder.

(13) A method for producing cubic boron nitride as described in any one of (5) to (12), wherein 2 to 50 parts by mass of the catalyst substance is added to 100 parts by mass of the hexagonal boron nitride, and the hexagonal boron nitride containing the catalyst substance is held under conditions in which cubic boron nitride remains thermodynamically stable so as to cause the hexagonal boron nitride to undergo a phase transition to form cubic boron nitride.

(14) A method for producing cubic boron nitride including a step of pulverizing the cubic boron nitride as described in any one of (1) to (3) so as to obtain cubic boron nitride having a mean particle size of 10 µm or less.

(15) A method for producing cubic boron nitride as described in (14), further comprising a step of classifying the pulverized cubic boron nitride so as to obtain cubic boron nitride having a mean particle size of 10 µm or less.

(16) Cubic boron nitride produced by a method for producing cubic boron nitride as recited in any one of (5) to (15).

(17) A grinding wheel including cubic boron nitride as recited in any one of (1) to (4) and (16).

(18) Sintered cubic boron nitride compact including cubic boron nitride as recited in any one of (1) to (4) and (16).

BRIEF DESCRIPTION OF THE DRAWING

The sole FIGURE of the drawing is a cross-section showing a general configuration of a reaction container employed in one embodiment of the method for producing cubic boron nitride of the present invention.

BEST MODES FOR CARRYING OUT THE INVENTION

Best modes for carrying out the present invention which relates to a method for producing cBN, to cBN, to a grinding wheel, and to a sintered cBN compact, will next be described.

Needless to say, the detailed descriptions of these embodiments are provided for the purpose of better understanding the gist of the present invention and, unless otherwise specified, should not be construed as limiting the invention thereto.

In the method for producing cBN of the present invention, hBN is held in the presence of a catalyst substance under conditions in which cBN remains thermodynamically stable, to thereby cause hBN to undergo a phase transition to form cBN, wherein the catalyst substance contains a lithium source, a magnesium source, and a carbon source.

In one embodiment of the production method, hBN powder is mixed with a catalyst substance, and the mixture is charged into a mold and uniaxially pressed at, for example, 100 to 200 MPa, to thereby yield a compact. The compact is accommodated in a reaction container and is disposed in an ultrahigh-pressure-generator, and the reaction container is maintained under conditions in which cBN remains thermodynamically stable (e.g., approximately 4 to 6 GPa, approximately 1,400 to 1,600° C., for about 1 sec to 6 hours), to thereby cause hBN to undergo a phase transition to form cBN. Through the phase transition, the compact containing hBN and the catalyst substance is converted into a synthesis ingot containing hBN, cBN, and the catalyst substance. The produced synthesis ingot is removed from the ultrahigh-pressure-generator. Thereafter, cBN is isolated and purified.

Commercial hBN powder may be employed as hBN serving as a starting material. However, when the hBN contains an oxygen impurity in the form of, for example, boron oxide, the oxygen impurity may retard phase transition from hBN to cBN. Therefore, hBN having a low oxygen content is preferably employed. Specifically, the hexagonal boron nitride preferably has an oxygen content of 1 mass % or lower.

The hBN preferably has a maximum particle size of up to 100 µm. When the particle is too large, reactivity of hBN with a catalyst substance decreases, resulting in a decrease in phase transition ratio into cubic boron nitride, which is not preferred.

The catalyst substance employed in the present invention includes a lithium source, a magnesium source, and a carbon source.

Lithium or a compound containing elemental lithium can be employed as the lithium source. Preferably, at least one selected from the group consisting of metallic lithium, lithium nitride, and lithium boronitride is employed.

Magnesium or a compound containing elemental magnesium can be employed as the magnesium source. Preferably, at least one selected from the group consisting of metallic magnesium, magnesium nitride, and magnesium boronitride is employed.

Carbon, a carbon allotrope, or a compound containing elemental carbon can be employed as the carbon source. Preferably, at least one selected from the group consisting of graphite, carbon black, amorphous carbon, and a hydrocarbon organic compound is employed. The carbon source is preferably in the form of powder.

The catalyst substance preferably has the minimum amount of impurities possible. In particular, among impurities, the presence of oxygen is not preferred since the phase transition from hBN to cBN is retarded.

The oxygen content is preferably 1 mass % or less, more preferably 0.5 mass % or less. When the oxygen content is in excess of 1 mass %, crystallinity of the produced cBN deteriorates.

No particular limitation is imposed on the particle size of the catalyst substance. Generally, the catalyst substance preferably has a maximum particle size of up to 100 µm. When the particle is too large, reactivity of the catalyst substance with hBN decreases, resulting in undesirable decrease in phase transition ratio into cubic boron nitride.

The catalyst substance employed includes a lithium source, a magnesium source, and a carbon source. Among combinations of the lithium source, magnesium source, and a carbon source, lithium nitride or lithium boronitride as the lithium source; metallic magnesium as the magnesium source; and graphite or amorphous carbon are preferably used in combination.

Among the preferred combinations, the combinations of "lithium nitride, metallic magnesium, and graphite" and "lithium nitride, metallic magnesium, and amorphous carbon" are most preferred. By employing any of the above combinations, cBN can be produced at highest phase transition ratio.

Regarding the amount of each of the lithium source and magnesium source contained in the catalyst substance, the magnesium atom content is preferably 5 to 300 parts by mole, and more preferably 100 to 300, based on 100 parts by mole of lithium atoms.

When the magnesium atom content is less than 5 parts by mole, phase transition ratio cannot be sufficiently enhanced, whereas when the magnesium atom content is in excess of 300 parts by mole, phase transition ratio cannot be further enhanced, and morphology of the cubic boron nitride is impaired, thereby deteriorating performance of abrasive grains.

Regarding the amount of each of the lithium source and carbon source contained in the catalyst substance, the carbon atom content is preferably 0.5 to 30 parts by mole based on 100 parts by mole of lithium atoms.

When the carbon atom content is less than 0.5 parts by mole, effects of mixing cannot be obtained, whereas when the content is in excess of 30 parts by mole, phase transition ratio into cubic boron nitride decreases, and growing speed of the cBN is affected.

The catalyst substance is generally prepared by a method including mixing a lithium source powder, a magnesium source powder, and a carbon source powder.

The catalyst substance is preferably mixed with hBN in an amount of 2 to 50 parts by mass based on 100 parts by mass of hBN, more preferably 5 to 30 parts by mass. When the amount of the catalyst substance is less than 2 parts by mass, mechanical strength and morphology of cBN are deteriorated, thereby deteriorating performance of abrasive grains, whereas when the amount is in excess of 50 parts by mass, the amount of hBN fed as a raw material decreases. This case is not preferred from the viewpoint of economy since the amount of cBN produced in one synthesis procedure decreases.

In a preferred method of treating the catalyst substance and hBN, powders of the components are mixed together. Alternatively, hBN powder and the catalyst substance may be placed in a reaction container such that two components are alternately stacked. Specifically, (1) hBN powder is mixed with a catalyst substance, and the mixture is charged into a mold and pressed at about 100 to 200 MPa, to thereby yield a compact. The compact is accommodated in a reaction container. Alternatively, (2) each of hBN powder and a catalyst substance powder is charged in a mold, and the charged powder is pressed at about 100 to 200 MPa, to thereby yield a thin-layer compact. The thus-formed hBN compacts and the catalyst substance compacts are alternately stacked, and the stacked body is accommodated in a reaction container.

By employing any of these methods, handling of raw material powders is facilitated, and an amount of volume reduction of the raw material accommodated in the reaction container decreases, leading to enhancement of productivity.

CBN seed crystals may be added in advance to the compact or the stacked body, to thereby promote crystal growth of cBN from the seed crystals serving as crystal nuclei. Needless to say, the present invention also encompasses such a method employing seed crystals. In this case, the seed crystals may be coated with the aforementioned catalyst substance.

After accommodating the aforementioned compact or stacked body in the reaction container, the reaction container is placed in a known ultrahigh-pressure-generator, where the reaction container is maintained under temperature/pressure conditions in which cBN remains thermodynamically stable.

The thermodynamically stable conditions of cBN are described a published literature (e.g., O. Fukunaga in Diamond Relat. Mater., 9, (2000), 7-12). No particular limitation is imposed on the time for holding the compact or stacked body, and the compact or stacked body is typically held for about 1 second to about 6 hours.

By maintaining the aforementioned compact or stacked body accommodated in the reaction container under the thermodynamically stable conditions, hBN undergoes a phase transition to form cBN, thereby yielding a synthesis ingot containing hBN, cBN, and the catalyst substance.

Subsequently, the synthesis ingot is crushed for isolating and purifying cBN. A known method for isolation and purification (see, for example, Japanese Examined Patent Application, Second Publication No. S49-27757) may be employed.

In one method, the synthesis ingot is crushed into granules of a size of 5 mm or less, and sodium hydroxide and a small amount of water are added to the granules. The mixture is heated at about 320° C., to thereby selectively dissolve hBN. The mixture is cooled, and undissolved matter is washed with acid and separated, to thereby yield cBN.

The cBN produced through the above method can be used as abrasive grains for grinding wheels or the like after screening into grit size fractions defined in the Japanese Industrial Standards (JIS B 4130: 1998, "Diamond/CBN products— Grain sizes of diamond or cubic boron nitride").

Moreover, after pulverizing the produced cBN, and more preferably, further classifying the pulverized cBN, so as to obtain fine particles having a mean particle size of 10 μm or less, the cBN can be used as raw material for sintered cBN compacts or the like.

It has been revealed that, in the cBN produced through the method of the present invention, the amount of cBN synthesizing catalyst, in particular, the amount of magnesium, contained in the crystal is controlled in a particular range.

Moreover, it has also been revealed that when the cBN produced through the method of the present invention is used as abrasive grains for a grinding wheel, the grinding wheel exhibits higher grinding ratio (i.e., less wear) and lower grinding power (lower grinding resistance) when compared with a grinding wheel which is fabricated using cBN produced through a conventional method.

Furthermore, it has also been revealed that a sintered compact, which is fabricated using cBN fine particles obtained by pulverizing the cBN produced through the method of the present invention, exhibits improved cutting performance, and more specifically, exhibits improved chipping resistance, when compared with a sintered compact which is fabricated using cBN fine particles obtained by pulverizing the cBN produced through a conventional method.

It has not been clearly understood why grinding performance of a grinding wheel and cutting performance of a sintered compact are improved when the cBN produced through the method of the present invention is used for forming the grinding wheel or sintered compact; however, because such effects are obtained when the amount of magnesium, which is one of the components of the cBN synthesizing catalyst, contained in the crystal is in a particular range, it is believed that magnesium contained in the cBN crystal has some effects in the sintering process of a grinding wheel or a sintered compact.

A preferable amount of magnesium contained in the cBN crystal is in a range of $2 \times 10^{-4}$ mol to $2 \times 10^{-2}$ mol per 1 mol of boron nitride molecule, and a more preferable amount of magnesium is in a range of $2 \times 10^{-3}$ mol to $2 \times 10^{-2}$ mol per 1 mol of boron nitride molecule, and a further preferable amount of magnesium is in a range of $2 \times 10^{-3}$ mol to $5 \times 10^{-3}$ mol per 1 mol of boron nitride molecule.

EXAMPLES

The present invention will next be described in more detail by way of Examples and Comparative Examples, which should not be construed as limiting the invention thereto.

Examples 1 to 16 and Comparative Examples 1 to 20

To hBN powder (100 parts by mass) containing an oxygen impurity (0.8 mass %) and a metallic impurity (0.2 mass %) and having a mean particle size of 12 μm, each catalyst substance (10 parts by mass) having a composition shown in Tables 1 and 2 was added, to thereby prepare a mixture of hBN and a catalyst substance. In Tables 1 and 2, the proportions of atoms (lithium, magnesium, carbon, and other elements) in catalyst substance are represented by relative amounts by mole.

Figure 1:
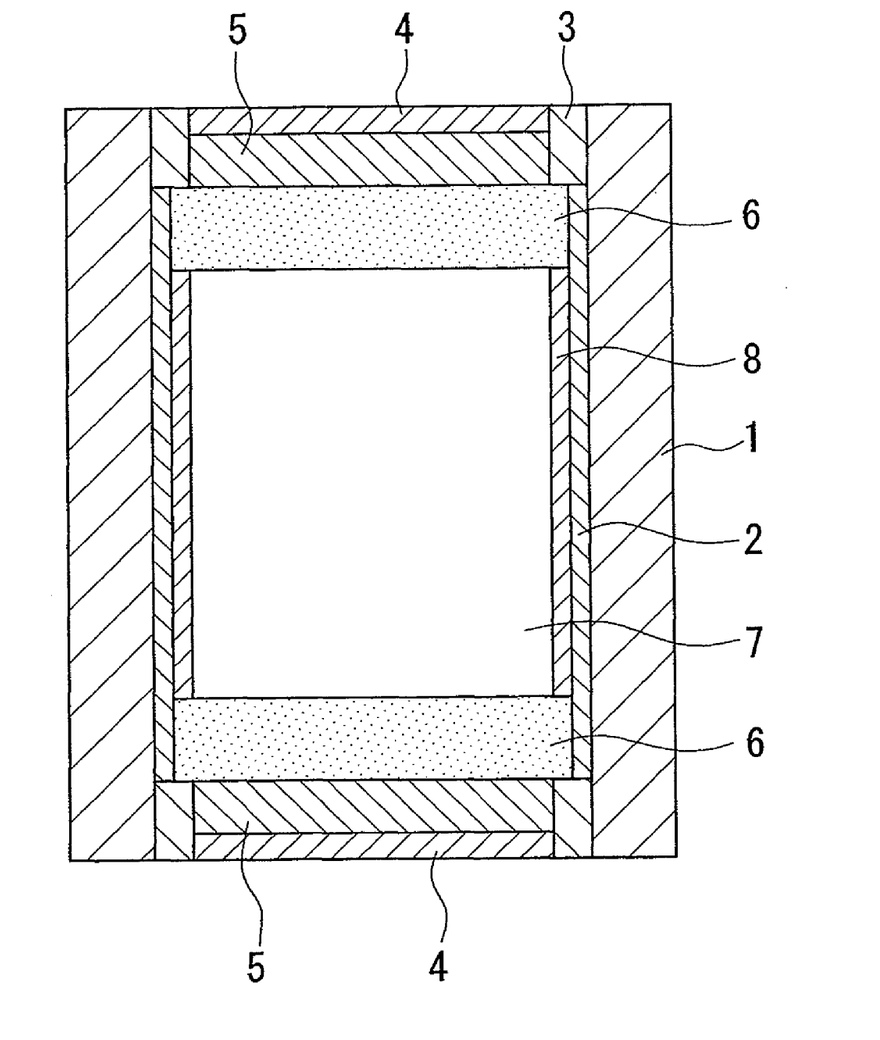

Subsequently, each of the mixtures of Examples 1 to 16 and Comparative Examples 1 to 20 was charged into a mold, and press-molded at 150 MPa, to thereby form a columnar compact (diameter: 26 mm, height: 32 mm). Each of the compacts was placed in a reaction container shown in the drawing.

The drawing is a cross-section showing a general configuration of the reaction container. In the drawing, reference numeral 1 denotes an outer wall of the container which is made of pyrophyllite, serving as a pressure conveyor, and has the shape of a hollow cylinder, and the inner side thereof is provided with a heater 2 consisting of a graphite hollow cylinder and a pyrophyllite liner 8 serving as a partitioning material. Also, the top and bottom ends of the container are each provided with a conducting steel ring 3 and a conducting steel plate 4, while the inner sides of the ring 3 and the plate 4 are provided with a sintered alumina plate 5 and a pyrophyllite plate 6 serving as a pressure conveyor, and the space surrounded by the pyrophyllite plate 6 and the pyrophyllite liner 8 serves as a chamber 7 for accommodating raw materials of reaction.

The reaction container was placed in an ultrahigh-pressure-generator, where each of the compacts obtained in Examples 1 to 16 and Comparative Examples 1 to 20 was treated for 10 minutes under the conditions of 5.0 GPa and 1,450° C.

Through the treatment, the synthesis ingots of Examples 1 to 16 and Comparative Examples 1 to 20 were produced. Each synthesis ingot was removed from the ultrahigh-pressure-generator, and crushed into granules having a size of 5 mm or less. Sodium hydroxide and a small amount of water were added to the granules, and the mixture was heated at about 320° C. The mixture was cooled, and undissolved matter was washed with acid and separated through filtration, to thereby yield cBN.

A potion of each of the thus-produced synthesis ingots was pulverized by means of a mortar, and the powder was analyzed by means of an X-ray diffractometer employing CuKα rays. The diffraction intensity of a peak attributed to a (111) plane of cBN and that attributed to a (002) plane of hBN were determined, and phase transition ratio into cubic boron nitride was calculated by the following formula:

$$(\text{intensity(cBN)}/(\text{intensity(cBN)}+\text{intensity(hBN)})) \times 100(\%).$$

The mechanical strength of the produced cubic boron nitride samples was evaluated in terms of toughness index. The toughness index was determined by the following procedure. Each produced cubic boron nitride sample (cBN) was screened to a grit size fraction $120/140$ as stipulated by Japanese Industrial Standards (JIS B 4130: 1998, "Diamond/CBN products—Grain sizes of diamond or cubic boron nitride"). A predetermined amount of the thus-obtained sample and a steel ball were placed in a 2 mL-capsule. The capsule was set in a vibrator and subjected to vibration at a frequency of 3,000±100 cycles/min for 30.0±0.3 sec, whereby the cubic boron nitride particles contained in the capsule were pulverized with a steel ball. The thus-obtained powder was screened by means of a 90 μm-mesh screen. The weight of the sample remaining on the screen was measured and expressed as percentage by weight with respect to the entire powder.

Moreover, the amount of magnesium contained in the produced cBN was measured. The magnesium contents by mole, which is contained in the cBN crystal, with respect to 1 mol of boron nitride molecules are shown in Tables 1 and 2.

TABLE 1

| | Type of catalyst substance | Proportion of atoms in catalyst substance (atomic ratio) | | | Phase transition ratio (%) | Toughness | Magnesium content by mole in 1 mol of cBN |
|---|---|---|---|---|---|---|---|
| | | Li | Mg | C | | | |
| Ex. 1 | Li, $Mg_3N_2$, graphite | 100 | 145 | 0.5 | 60 | 51 | $1.3 \times 10^{-2}$ |
| Ex. 2 | Li, $Mg_3B_2N_4$, graphite | 100 | 145 | 0.5 | 62 | 50 | $1.6 \times 10^{-2}$ |
| Ex. 3 | Li, Mg, graphite | 100 | 145 | 0.5 | 61 | 55 | $9.2 \times 10^{-3}$ |
| Ex. 4 | $Li_3N$, $Mg_3N_2$, graphite | 100 | 225 | 1 | 63 | 52 | $1.4 \times 10^{-2}$ |
| Ex. 5 | $Li_3N$, $Mg_3B_2N_4$, graphite | 100 | 225 | 1 | 61 | 54 | $1.0 \times 10^{-2}$ |
| Ex. 6 | $Li_3N$, Mg, graphite | 100 | 225 | 1 | 64 | 57 | $5.0 \times 10^{-3}$ |
| Ex. 7 | $Li_3N$, $Mg_3N_2$, graphite | 100 | 175 | 1 | 60 | 53 | $7.3 \times 10^{-3}$ |
| Ex. 8 | $Li_3N$, $Mg_3B_2N_4$, graphite | 100 | 175 | 1 | 61 | 54 | $5.8 \times 10^{-3}$ |
| Ex. 9 | $Li_3N$, Mg, graphite | 100 | 175 | 1 | 64 | 58 | $4.8 \times 10^{-3}$ |
| Ex. 10 | $Li_3N$, Mg, graphite | 100 | 5 | 2.5 | 55 | 56 | $1.1 \times 10^{-3}$ |
| Ex. 11 | $Li_3N$, Mg, graphite | 100 | 50 | 2.5 | 60 | 59 | $1.9 \times 10^{-3}$ |
| Ex. 12 | $Li_3N$, Mg, graphite | 100 | 105 | 2.5 | 62 | 55 | $4.5 \times 10^{-3}$ |
| Ex. 13 | $Li_3BN_2$, $Mg_3N_2$, carbon black | 100 | 100 | 5 | 56 | 58 | $8.4 \times 10^{-3}$ |
| Ex. 14 | $Li_3BN_2$, $Mg_3B_2N_4$, carbon black | 100 | 100 | 5 | 55 | 53 | $6.7 \times 10^{-3}$ |
| Ex. 15 | $Li_3BN_2$, Mg, carbon black | 100 | 100 | 5 | 57 | 52 | $7.2 \times 10^{-3}$ |
| Ex. 16 | $Li_3BN_2$, Mg, carbon black | 100 | 100 | 25 | 55 | 52 | $3.2 \times 10^{-4}$ |

TABLE 2

| | Type of catalyst substance | Proportion of atoms in catalyst substance (atomic ratio) | | | | Phase transition ratio (%) | Toughness | Magnesium content by mole in 1 mol of cBN |
|---|---|---|---|---|---|---|---|---|
| | | Li | Mg | C | others | | | |
| Comp. Ex. 1 | Li, Mg | 100 | 50 | | | 57 | 40 | $2.3 \times 10^{-2}$ |
| Comp. Ex. 2 | Li, $Mg_3N_2$ | 100 | 50 | | | 58 | 44 | $2.2 \times 10^{-2}$ |
| Comp. Ex. 3 | Li, $Mg_3B_2N_4$ | 100 | 50 | | | 57 | 42 | $2.7 \times 10^{-2}$ |
| Comp. Ex. 4 | $Li_3N$, Mg | 100 | 175 | | | 59 | 37 | $2.8 \times 10^{-2}$ |
| Comp. Ex. 5 | $Li_3N$, $Mg_3N_2$ | 100 | 175 | | | 57 | 38 | $2.1 \times 10^{-2}$ |
| Comp. Ex. 6 | $Li_3N$, $Mg_3B_2N_4$ | 100 | 175 | | | 58 | 40 | $2.7 \times 10^{-2}$ |
| Comp. Ex. 7 | $Li_3N$, Mg, graphite | 100 | 3 | 1 | | 42 | 50 | $1.3 \times 10^{-4}$ |
| Comp. Ex. 8 | $Li_3N$, Mg, graphite | 100 | 350 | 1 | | 56 | 35 | $3.1 \times 10^{-2}$ |
| Comp. Ex. 9 | Mg, graphite | | 100 | 5 | | 52 | 42 | $2.5 \times 10^{-2}$ |
| Comp. Ex. 10 | $Mg_3N_2$, graphite | | 100 | 5 | | 50 | 43 | $2.2 \times 10^{-2}$ |
| Comp. Ex. 11 | $Mg_3B_2N_4$, graphite | | 100 | 5 | | 50 | 39 | $2.7 \times 10^{-2}$ |
| Comp. Ex. 12 | $Li_3BN_2$, graphite | 100 | | | 2 | 46 | 44 | $<5 \times 10^{-6}$ |
| Comp. Ex. 13 | $Li_3BN_2$, carbon black | 100 | | | 2 | 48 | 42 | $<5 \times 10^{-6}$ |
| Comp. Ex. 14 | $Li_3BN_2$, amorphous carbon | 100 | | | 2 | 45 | 41 | $<5 \times 10^{-6}$ |

TABLE 2-continued

|  | Type of catalyst substance | Proportion of atoms in catalyst substance (atomic ratio) | | | | Phase transition ratio (%) | Toughness | Magnesium content by mole in 1 mol of cBN |
|---|---|---|---|---|---|---|---|---|
|  |  | Li | Mg | C | others | | | |
| Comp. Ex. 15 | Li$_3$N, Mg, graphite | 100 | 50 | 0.2 | | 52 | 42 | $2.3 \times 10^{-2}$ |
| Comp. Ex. 16 | Li$_3$N, Mg, graphite | 100 | 145 | 0.2 | | 52 | 38 | $2.6 \times 10^{-2}$ |
| Comp. Ex. 17 | Li$_3$BN$_2$, Mg, carbon black | 100 | 145 | 50 | | 38 | 37 | $2.7 \times 10^{-2}$ |
| Comp. Ex. 18 | LiCaBN$_2$ | 100 | | | Ca 100 | 35 | 53 | $<5 \times 10^{-6}$ |
| Comp. Ex. 19 | LiCaBN$_2$, Mg | 100 | 145 | | Ca 100 | 41 | 44 | $2.9 \times 10^{-2}$ |
| Comp. Ex. 20 | LiCaBN$_2$, Mg | 100 | 175 | | Ca 100 | 43 | 46 | $2.5 \times 10^{-2}$ |

Examples 17 to 20 and Comparative Examples 21 to 24

Each of cubic boron nitride samples produced through the procedures of Examples 6, 9, 10, and 12 and Comparative Examples 4, 7, 8, and 18 was classified to grit size fractions as stipulated by the Japanese Industrial Standards (JIS B 4130: 1998). Grinding wheel segments were produced from abrasive grains belonging to a grit size fraction $^{100}/_{120}$. Specifically, a mixture containing the abrasive grains (50 vol (v/v) %), a borosilicate glass bond (20 vol (v/v) %) serving as a binding agent, and a binder (30 vol (v/v) %) (phenolic resin) was prepared. The mixture was press-formed at 150° C., and the resulting compact was fired at 900° C. (in air), to thereby produce a grinding wheel segment. The employed binder burned to form pores during the course of firing for producing a grinding wheel segment.

Each of the produced grinding wheel segments was bonded to an aluminum alloy substrate, to thereby form a grinding wheel, and the grinding wheel was subjected to a grinding test under the following conditions.

(Test Conditions)
Grinding wheel: 1A1 type, 205D×10U×5X×76.2H
Grinding machine: Horizontal-spindle surface grinding machine (grinding wheel spindle motor: 3.7 kW)
Workpiece: SKH-51 (HRc=62 to 64)
Surface area of workpiece: 200 mm×100 mm
Method of grinding: Wet surface traverse grinding
Grinding Conditions:
  Wheel speed: 1,800 m/min
  Table speed: 15 m/min
  Cross feed: 4 mm/pass
  Infeed: 15 μm
Grinding fluid: Fluid exclusively for cBN (water soluble×50 diluted), feed 9 L/min The symbols defining the shape of the grinding wheel are expressed in accordance with JIS B 4131: 1998 "Diamond/CBN products—Diamond or CBN grinding wheels", the reference symbol for the workpiece is expressed in accordance with JIS G 4403 "High speed tool steel". The workpieces were purchased from those commercially available.

Grinding wheels produced from cBN samples produced through procedures of Examples 6, 9, 10, and 12 and Comparative Examples 4, 7, 8, and 18 are denoted by Example 17 sample to Example 20 sample and Comparative Example 21 sample to Comparative Example 22 sample, respectively. The results of evaluation are shown in Table 3.

Grinding ratio is obtained by dividing volume of a workpiece removed through grinding by volume of grinding wheel wear during grinding, and grinding power refers to electric power consumed for operating a grinding machine during grinding. In other words, the higher the grinding ratio, the higher the grinding performance of grinding wheel, and the lower the grinding power, the higher the grinding performance of grinding wheel.

The amounts of magnesium contained in the cBN produced using the methods according to Examples 6, 9, 10, and 12 and Comparative Examples 4, 7, 8, and 18 are expressed by number of mol with respect to 1 mol of boron nitride molecules in Table 3.

TABLE 3

|  | Abrasive grains | Magnesium content by mole in 1 mol of cBN | Grinding ratio | Grinding power (W) |
|---|---|---|---|---|
| Ex. 17 | Ex. 6 | $5.0 \times 10^{-3}$ | 1,282 | 460 |
| Ex. 18 | Ex. 9 | $4.8 \times 10^{-3}$ | 1,233 | 400 |
| Ex. 19 | Ex. 10 | $1.1 \times 10^{-3}$ | 1,224 | 490 |
| Ex. 20 | Ex. 12 | $4.5 \times 10^{-3}$ | 1,272 | 410 |
| Comp. Ex. 21 | Comp. Ex. 4 | $2.8 \times 10^{-2}$ | 1,008 | 510 |
| Comp. Ex. 22 | Comp. Ex. 7 | $1.3 \times 10^{-4}$ | 1,128 | 510 |
| Comp. Ex. 23 | Comp. Ex. 8 | $3.1 \times 10^{-2}$ | 1,097 | 510 |
| Comp. Ex. 24 | Comp. Ex. 18 | $<5 \times 10^{-6}$ | 1,077 | 550 |

Examples 21 to 29 and Comparative Examples 25 to 36

The cBN grains according to Example 9 and Comparative Examples 4, 7, 8, and 18 were pulverized, were washed with acid, and were classified so as to obtain cBN fine particles having a mean particle size of 1.5 μm. The cBN particles as raw material were mixed with a powder of binding agent shown in Table 4 under wet conditions using a ball mill having a ball of cemented carbide for 24 hours. Acetone (classified in the highest degree in reagent) was used as a mixing solvent. After mixing, the mixture was sufficiently dried, and was charged in a reaction container with a circular disc of cemented carbide serving as a substrate. The reaction container was accommodated in an ultrahigh-pressure generator, and was treated for 1 hour under the conditions of about 5.3 GPa and 1,300° C. so as to obtain sintered cBN compacts combined with the circular disc of cemented carbide. Each of the sintered compacts had a diameter of 29 mm, a thickness of 1.2 mm for the sintered cBN compact, and a thickness of 5.0 mm for the entirety including the circular disc of cemented carbide. The crystal compositions of binder phase of the sintered cBN compacts are shown in Table 4 as Examples 21 to 29 and Comparative Examples 25 to 36. It is believed that tungsten carbide (WC) or tungsten boride included in the crystal compositions originates from mixing using the ball mill.

Upper and lower surfaces of each of the sintered compacts were ground using a diamond grinding wheel, and each of the sintered compacts was cut into 13 mm square segments using a commercially available arc discharge type wire cutting apparatus or a laser type cutting apparatus. Using these segments, tools having a shape defined as SNMN120308 according to the JIS B 4120: 1998, "Indexable inserts for cutting tools-designation".

These tools were subjected to dry peripheral cutting tests, in which workpieces of commercially available steel, each of which has eight grooves on the peripheral surface thereof, and is defined as SKD11 (HRc=60) according to the JIS G 4404: 2000, "Alloy tool steels", are machined under the conditions in which cutting speed was set to be 100 m/min, depth of cut was set to be 0.3 mm, and feed was set to be 0.15 mm/rev, and the number of impacts was counted until each of the tools chipped off.

The test results are shown in Table 4. A greater number of impacts indicates that the tool has a greater chipping resistance.

INDUSTRIAL APPLICABILITY

The method for producing cBN of the present invention enables producing cBN having improved performance even though phase transition ratio is increased; therefore, the method is extremely valuable in industry.

Moreover, in the cBN produced using the method of the present invention, the amount of magnesium contained in the cBN crystal is controlled in a particular range; therefore, when the cBN is used for forming a grinding wheel or a sintered compact, the cBN improves grinding performance of the grinding wheel and cutting performance of the sintered compact; accordingly, such cBN is extremely valuable.

The invention claimed is:

1. Cubic boron nitride containing magnesium, wherein the magnesium is contained in the cubic boron nitride crystal in an amount from $2 \times 10^{-4}$ mol to $2 \times 10^{-2}$ mol per 1 mol of cubic boron nitride, and the cubic boron nitride having a toughness index in a range of 50 to 59.

2. Cubic boron nitride as claimed in claim 1, wherein the cubic boron nitride contains magnesium in an amount from $2 \times 10^{-3}$ mol to $2 \times 10^{-2}$ mol per 1 mol of cubic boron nitride.

3. Cubic boron nitride as claimed in claim 1, wherein the cubic boron nitride contains magnesium in an amount from $2 \times 10^{-3}$ mol to $5 \times 10^{-3}$ mol per 1 mol of cubic boron nitride.

TABLE 4

| | Abrasive grains | Compositional proportions (mass %) | | | | | | Crystal composition of binder phase in sintered compact (Components in parentheses are due to impurities originating from the apparatus) | Number of impacts |
|---|---|---|---|---|---|---|---|---|---|
| | | cBN | TiN | AlN | Ti$_2$AlN | WC | Co | | |
| Ex. 21 | Ex. 9 | 80 | — | 2 | — | 6 | 12 | WCoB, W$_2$Co$_{21}$B$_6$, AlN | 2900 |
| Ex. 22 | Ex. 9 | 80 | 12 | 8 | — | — | — | TiN, AlN, TiB$_2$, (WC) | 3300 |
| Ex. 23 | Ex. 9 | 80 | — | — | 20 | — | — | TiN, AlN, TiB$_2$, (WB) | 3400 |
| Ex. 24 | Ex. 9 | 70 | 22 | 8 | — | — | — | TiN, AlN, TiB$_2$, (WC) | 4000 |
| Ex. 25 | Ex. 9 | 70 | — | — | 30 | — | — | TiN, AlN, TiB$_2$, (WC, W$_2$B) | 4300 |
| Ex. 26 | Ex. 9 | 60 | 32 | 8 | — | — | — | TiN, AlN, TiB$_2$, (WC) | 6000 |
| Ex. 27 | Ex. 9 | 60 | — | — | 40 | — | — | TiN, AlN, TiB$_2$, (WB, W$_2$B) | 7000 |
| Ex. 28 | Ex. 9 | 50 | 42 | 8 | — | — | — | TiN, AlN, TiB$_2$, (WC) | 6000 |
| Ex. 29 | Ex. 9 | 50 | — | — | 50 | — | — | TiN, AlN, TiB$_2$, (WB, W$_2$B) | 6700 |
| Comp. Ex. 25 | Comp. Ex. 4 | 80 | — | 2 | — | 6 | 12 | WCoB, W$_2$Co$_{21}$B$_6$, AlN | 2000 |
| Comp. Ex. 26 | Comp. Ex. 7 | 80 | — | 2 | — | 6 | 12 | WCoB, W$_2$Co$_{21}$B$_6$, AlN | 1800 |
| Comp. Ex. 27 | Comp. Ex. 8 | 80 | — | 2 | — | 6 | 12 | WCoB, W$_2$Co$_{21}$B$_6$, AlN | 1700 |
| Comp. Ex. 28 | Comp. Ex. 18 | 80 | — | 2 | — | 6 | 12 | WCoB, W$_2$Co$_{21}$B$_6$, AlN | 1800 |
| Comp. Ex. 29 | Comp. Ex. 7 | 80 | 12 | 8 | — | — | — | TiN, AlN, TiB$_2$, (WC) | 2000 |
| Comp. Ex. 30 | Comp. Ex. 7 | 80 | — | — | 20 | — | — | TiN, AlN, TiB$_2$, (WB) | 1900 |
| Comp. Ex. 31 | Comp. Ex. 7 | 70 | 22 | 8 | — | — | — | TiN, AlN, TiB$_2$, (WC) | 2500 |
| Comp. Ex. 32 | Comp. Ex. 7 | 70 | — | — | 30 | — | — | TiN, AlN, TiB$_2$, (WC, W$_2$B) | 2900 |
| Comp. Ex. 33 | Comp. Ex. 7 | 60 | 32 | 8 | — | — | — | TiN, AlN, TiB$_2$, (WC) | 4500 |
| Comp. Ex. 34 | Comp. Ex. 7 | 60 | — | — | 40 | — | — | TiN, AlN, TiB$_2$, (WB, W$_2$B) | 5000 |
| Comp. Ex. 35 | Comp. Ex. 7 | 50 | 42 | 8 | — | — | — | TiN, AlN, TiB$_2$, (WC) | 4500 |
| Comp. Ex. 36 | Comp. Ex. 7 | 50 | — | — | 50 | — | — | TiN, AlN, TiB$_2$, (WB, W$_2$B) | 4800 |

4. Cubic boron nitride as claimed in claim 1, wherein a mean particle size of the cubic boron nitride is 10 μm or less.

5. A method for producing cubic boron nitride in which hexagonal boron nitride is held in the presence of a catalyst substance under conditions in which cubic boron nitride remains thermodynamically stable, to thereby cause hexagonal boron nitride to undergo a phase transition to form cubic boron nitride, wherein the catalyst substance contains a lithium source, a magnesium source, and a carbon source, and the catalyst substance contains magnesium atoms in an amount of 5 to 300 parts by mole, and carbon atoms in an amount of 0.5 to 30 parts by mole, based on 100 parts by mole of lithium atoms.

6. A method for producing cubic boron nitride as claimed in claim 5, wherein the catalyst substance contains magnesium atoms in an amount of 100 to 300 parts by mole based on 100 parts by mole of lithium atoms.

7. A method for producing cubic boron nitride as claimed in claim 5, wherein the catalyst substance contains magnesium atoms in an amount of 5 to 85 parts by mole based on 100 parts by mole of lithium atoms.

8. A method for producing cubic boron nitride as claimed in claim 5, wherein the lithium source is at least one selected from the group consisting of metallic lithium, lithium nitride, and lithium boronitride.

9. A method for producing cubic boron nitride as claimed in claim 5, wherein the magnesium source is at least one selected from the group consisting of metallic magnesium, magnesium nitride, and magnesium boronitride.

10. A method for producing cubic boron nitride as claimed in claim 5, wherein the hexagonal boron nitride has an oxygen content of 1 mass % or less.

11. A method for producing cubic boron nitride as claimed in claim 5, wherein the carbon source is at least one selected from the group consisting of graphite, carbon black, amorphous carbon, and a hydrocarbon.

12. A method for producing cubic boron nitride as claimed in claim 11, wherein the carbon source is at least one selected from the group consisting of graphite, carbon black, and amorphous carbon.

13. A method for producing cubic boron nitride as claimed in claim 5, wherein the carbon source is in the form of powder.

14. A method for producing cubic boron nitride as claimed in claim 5, wherein 2 to 50 parts by mass of the catalyst substance is added to 100 parts by mass of the hexagonal boron nitride, and the hexagonal boron nitride containing the catalyst substance is held under conditions in which cubic boron nitride remains thermodynamically stable so as to cause the hexagonal boron nitride to undergo a phase transition to form cubic boron nitride.

15. A method for producing cubic boron nitride comprising a step of pulverizing the cubic boron nitride as claimed in claim 1 so as to obtain cubic boron nitride having a mean particle size of 10 μm or less.

16. A method for producing cubic boron nitride as claimed in claim 15, further comprising a step of classifying the pulverized cubic boron nitride so as to obtain cubic boron nitride having a mean particle size of 10 μm or less.

* * * * *